(12) United States Patent
Cambridge

(10) Patent No.: US 10,200,680 B2
(45) Date of Patent: Feb. 5, 2019

(54) EYE GAZE RESPONSIVE VIRTUAL REALITY HEADSET

(71) Applicant: THIKA HOLDINGS LLC, St. Pete Beach, FL (US)

(72) Inventor: Vivien Johan Cambridge, Myrtle Beach, SC (US)

(73) Assignee: THIKA HOLDINGS LLC, St. Pete Beach, FL (US)

( * ) Notice: Subject to any disclaimer, the term of this patent is extended or adjusted under 35 U.S.C. 154(b) by 48 days.

(21) Appl. No.: 15/283,725

(22) Filed: Oct. 3, 2016

(65) Prior Publication Data

US 2017/0099478 A1 Apr. 6, 2017

Related U.S. Application Data

(60) Provisional application No. 62/236,964, filed on Oct. 4, 2015.

(51) Int. Cl.
| | | |
|---|---|---|
| *H04N 13/344* | (2018.01) | |
| *H04N 13/398* | (2018.01) | |
| *G02B 27/00* | (2006.01) | |
| *G02B 27/01* | (2006.01) | |
| *G06F 3/00* | (2006.01) | |
| *G06F 3/01* | (2006.01) | |
| *H04N 13/383* | (2018.01) | |

(52) U.S. Cl.
CPC ....... *H04N 13/344* (2018.05); *G02B 27/0093* (2013.01); *G02B 27/0172* (2013.01); *G02B 27/0176* (2013.01); *G06F 3/005* (2013.01); *G06F 3/011* (2013.01); *G06F 3/012* (2013.01); *G06F 3/013* (2013.01); *H04N 13/383* (2018.05); *H04N 13/398* (2018.05); *G02B 2027/014* (2013.01); *G02B 2027/0134* (2013.01); *G02B 2027/0138* (2013.01); *G02B 2027/0159* (2013.01); *G02B 2027/0187* (2013.01); *H04N 2213/001* (2013.01)

(58) Field of Classification Search
CPC ....... A61B 3/0041; A61B 3/032; A61B 3/113; A61B 3/18
USPC .................................................... 348/36–61
See application file for complete search history.

(56) References Cited

U.S. PATENT DOCUMENTS

| 6,409,599 B1 | 6/2002 | Sprout |
|---|---|---|
| 9,094,677 B1 | 7/2015 | Mendis et al. |

(Continued)

OTHER PUBLICATIONS

International Search Report and Written Opinion dated Dec. 29, 2016 received in the corresponding PCT Application PCT/US16/54648.

*Primary Examiner* — Anand S Rao
(74) *Attorney, Agent, or Firm* — Volpe and Koenig, P.C.

(57) ABSTRACT

A headset for providing images to a user is provided. The headset is configured to attach to a user's head and includes displays positioned adjacent to a user's eyes. A display support arm is connected to the displays. A motor is connected to the display support arm and drives the display support arm between multiple positions. A camera is positioned adjacent to the user's eyes and records the user's eyes. A processor receives data from the camera regarding a position and movement of the user's eyes. The processor uses the data from the camera to drive the motor and to position the display support arm with respect to the user's eyes such that the displays maintain a position adjacent to the user's eyes.

10 Claims, 7 Drawing Sheets

(56) References Cited

U.S. PATENT DOCUMENTS 9,788,714 B2 * 10/2017 Krueger ............... A61B 3/0041
2008/0002262 A1 1/2008 Chirieleison

* cited by examiner

EYE GAZE RESPONSIVE VIRTUAL REALITY HEADSET

CROSS-REFERENCE TO RELATED APPLICATIONS

This application claims the benefit of U.S. provisional patent application 62/236,964, filed on Oct. 4, 2015, the entire contents of which is incorporated by reference as if fully set forth herein.

FIELD OF THE INVENTION

The present invention relates to a head-mounted display device and a control method for the head-mounted display device.

BACKGROUND

The present state of the art includes a head-mounted display ("HMD") device that is mounted on the user's head and includes one or more display devices for presenting stereoscopic images to a user's left eye and a user's right eye so that the user perceives images in three dimensions. The images in the HMD can be related to a virtual or real world scene and the images are related to the user's head's orientation so that the user feels immersed in a scene presented by the display. The display devices in the HMD device may be liquid crystal displays and a light source that guides the generated image light to the eyes through a projection optical system and a light guide plate for proper vision at small distance.

In the HMD of the present state of the art, the resolution of the images presented to the eye is limited by the capacity of the displays. The higher resolution of a display presents an improved image in terms of clarity and definition. The angle of view of systems of the present state of the art is determined by the size of the displays in front of the eyes. If the display in front of the eyes is increased, then the angle of view is also increased. Systems of the present state of the art do not allow the user to move their eyes left and right outside the viewing cone, which is determined by the angle of view of the displays. Instead, the user changes his or her perspective in the virtual or real world by rotating his head while keeping his eyes generally straight ahead focused on the displays. The need to move one's head for moderate changes in perspective may place an unnecessary burden on the user's neck and shoulder muscles. In addition to this ergonomic problem, a user's natural tendency is to change their view by slightly adjusting the direction of his eyes. Therefore, the method of changing the direction of view by changing the angle of the entire head as is required with current headsets is not natural and can be strenuous on the user.

It would be desirable to provide a virtual reality headset that allows a user to explore a corresponding virtual world by allowing minor eye movement by the user to adjust the corresponding view in the virtual world.

SUMMARY OF THE INVENTION

The present invention provides, generally, a wearable device for viewing images, having displays that move in response to the movement of a user's (wearer's) eye movement. The user's eye movement is detected, sensed, measured, or otherwise captured, and processed. The results of such processing are used to move the displays to correspond to the eye movement.

A wearable device for a user's head is disclosed that presents images to a user's left eye and a user's right eye. The images presented to the user are related to a virtual world, an animation, digital images, or to recorded images of a real-world or other recording, and the images are stereoscopic so that world is perceived by the user as being three-dimensional. In one embodiment, the images are presented to the left eye and the right eye through a left display and a right display, with each display being adjustable and movable, either together or independently, and the displays are oriented in the direction of the left eye and the right eye as the eyes move.

Generally, the displays move and orient in response to eye movement. The system records or otherwise detects the movement the user's eyes though one or more cameras or other sensors focused on the eyes, and uses the imagery captured by the camera to calculate data related to the relative position of the user's eyes. The displays are attached to a support that is moved via motors that are controlled by a controller. The data related to movement of the user's eyes is used to position the displays. The data related to movement of the user's eyes is also used to control the image displayed on the displays. Therefore, the effective field of view of the headset is increased without deterioration of resolution of the image presented to the user. This allows the user to more naturally and comfortably view the virtual world. A user can gaze around a virtual world using eye movement, as in the real world.

In one embodiment, a user's gaze is detected through one or more cameras, or other sensors or detectors, viewing the user's eyes and through software that detects the movement of parts of the eyes, e.g. the pupils of the eyes. The system of the present invention includes displays that are in the field of view of the user's eyes. The displays are moved and repositioned as the user's eyes move so that the displays are constantly positioned in front of the user's eyes. The system of the present invention also causes the image displayed to the user to change depending on the movement of the user's eyes so that the displayed image is related to the field of view commensurate with the state and positioning of the user's eyes.

DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION

Figure 1A:
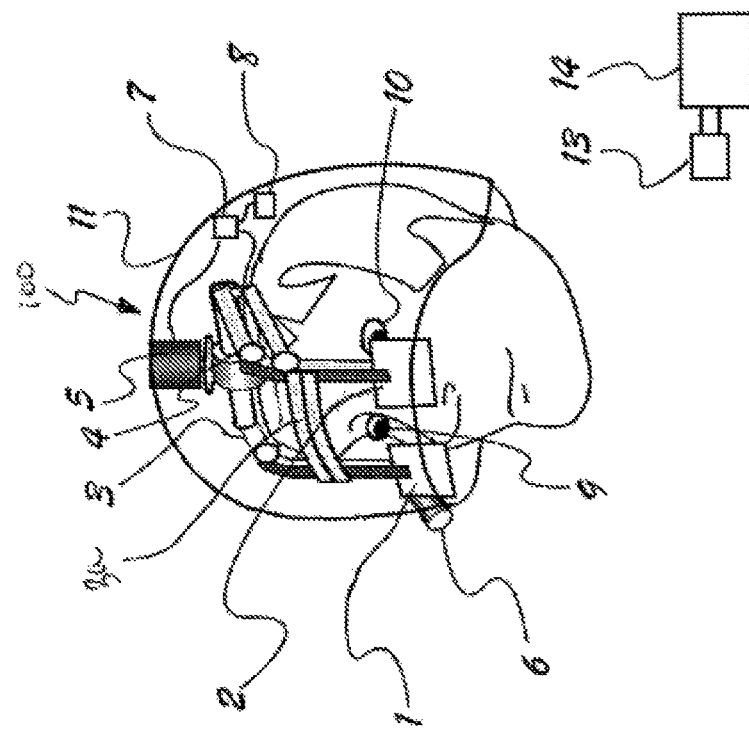
FIGS. 1A and 1B illustrate a first embodiment of a headset according in an upward and downward position.

Certain terminology is used in the following description for convenience only and is not limiting. The words "front,"

"rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1B:
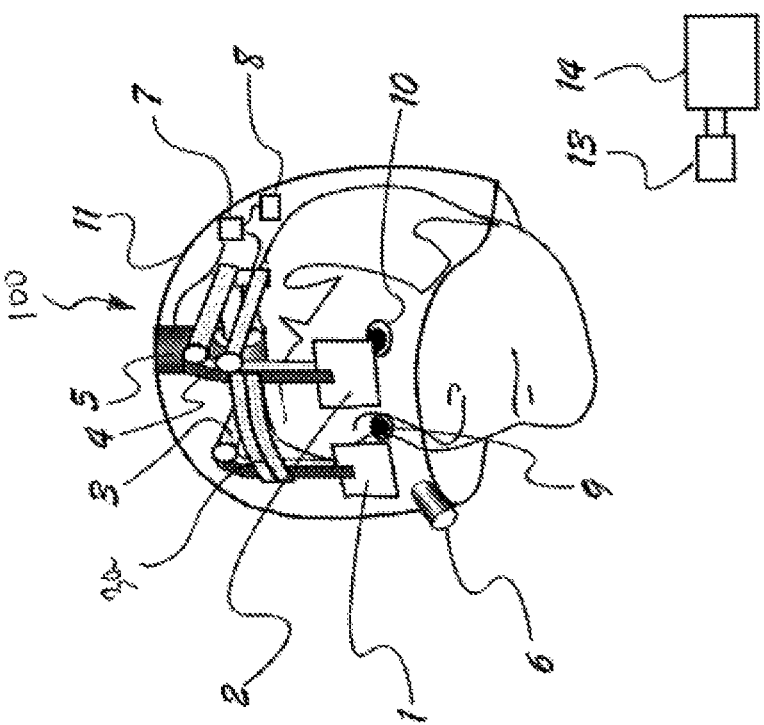
Figure 2:
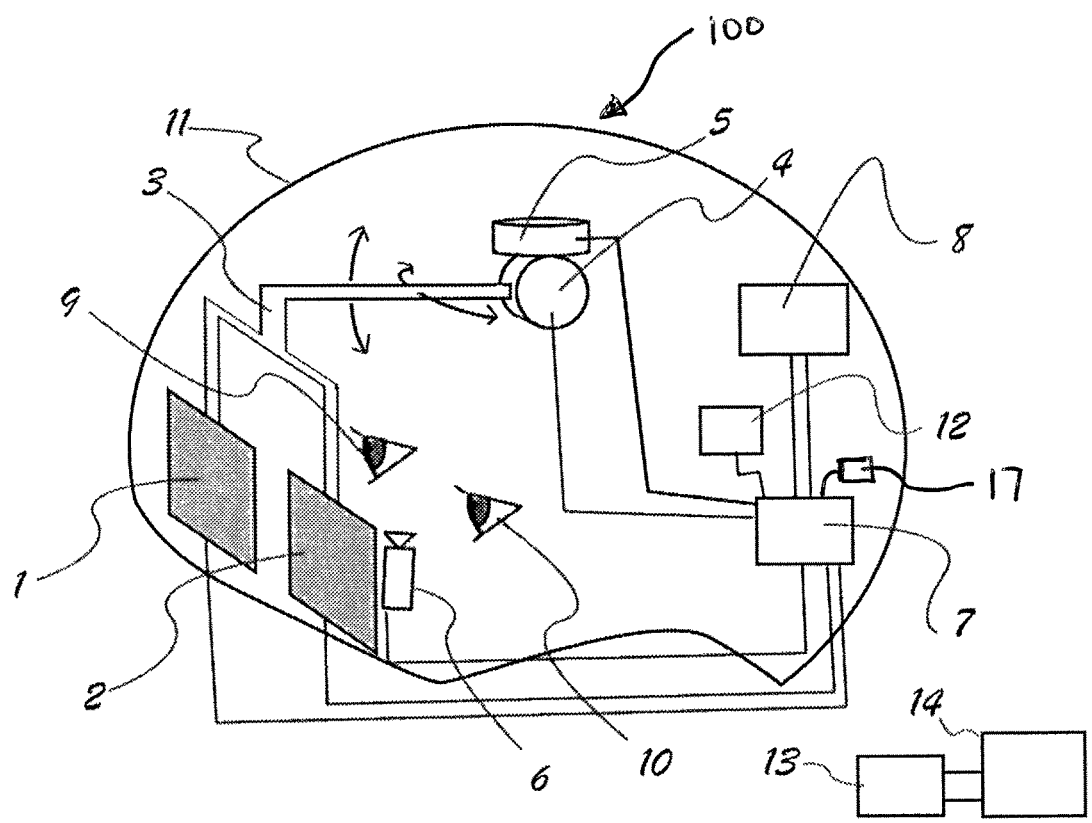
FIG. 2 illustrates the first embodiment of the headset.

As shown in FIGS. 1A, 1B, and 2, a system 100 is provided for displaying images to a user. The system 100 includes a headset 11 that can be fastened to a user's head or otherwise attached to a user. For example, a strap, multiple straps, or a helmet arrangement can be used to attach the headset 11 to the user. The system 100 includes two displays 1, 2 that are positioned in front of a user's eyes 9, 10. The images provided by the displays 1, 2 can include any type of image, such as a video game, recorded images, live images, film, three-dimensional virtual world, or other type of image.

The displays 1, 2 are attached to a display support arm 3. The display support arm 3 is illustrated as forked-type bar in the drawings. As shown in FIGS. 1A, and 1B, a crossbar 3a is provided between separate prongs of the display support bar 3. In FIG. 2, the display support arm 3 lacks any such crossbar 3a. One of ordinary skill in the art will recognize from the present disclosure that alternative configurations of the display support arm 3 can be used. For example, the display support arm 3 could include multiple articulated joints and a plurality of arms. In one embodiment, the displays 1, 2 are each attached to a separately articulated display support arm, and the displays 1, 2, are independently positioned from each other.

The display support arm 3 is attached to a pitch rotating motor 4, and the display support arm 3 is configured to be manipulated by the pitch rotating motor 4. The pitch rotating motor 4 moves the display support arm 3 in three dimensions to move the displays 1, 2 with respect to the user's eyes 9, 10. The pitch rotating motor 4 is also attached to a yaw rotating motor 5 so that the pitch motor 4 and the yaw rotating motor 5 control the position of the displays 1, 2 in front of a user's eyes 9, 10. Other types of motors can be used, as long as the motors have sufficient a sufficient degree of motion to move the display support arm 3. Actuation of the pitch rotating motor 4 and the yaw rotating motor 5 is controlled by a processor 7 within the headset 11. The processor 7 sends signals to the motors 4, 5 to drive the motors 4, 5 and move the display support arm 3 in multiple directions.

The system 100 also includes a camera 6 for tracking the user's eyes 9, 10. The camera 6 is fixed within the headset 11 relatively close to the user's eyes 9, 10 such that the camera 6 has an unobstructed line of sight to the user's eyes 9, 10. Data from the camera 6 is transmitted to the processor 7. The camera 6 preferably includes a pupil tracking lens that specifically locates and maps movement of the eye. The camera 6 can track rotation of the eyes, position of the pupil, or other characteristics of the eye. The camera 6 has a very high sampling rate, preferably of at least 30 Hz, more preferably between 50-350 Hz, and most preferably of at least 1000 Hz. Although only one camera 6 is shown in the figures, one of ordinary skill in the art would recognize that multiple cameras 6 can be used.

In one embodiment, the camera 6 is an active light projecting infrared camera system focused on the user's eyes 9, 10. The camera 6 acquires data comprising an image sequence depicting the pupil of the eye in high contract. Sequential images are analyzed through software in the processor 7 to determine a movement vector that maps a deviation of a center of the pupil from a reference point. This reference point may be the center of the image or it may be a point detected through a calibration procedure related to an orthogonal, straight forward, gaze of the user with a reference point in the image. In one embodiment, the user may be prompted to look straight ahead and press a button, i.e. a key on a keyboard, to relate in software running in processor 7 the current image acquired with the orthogonal gaze. The movement vector then is used to provide motion input commands to the motors 4, 5, and/or to adjust the images provided to the displays 1, 2.

Data from the camera 6 is processed by the processor 7 and is used to drive the motors 4, 5 so that the displays 1, 2 remain in front of the user's eyes 9, 10 as the user moves their eyes 9, 10. For example, if a user moves their eyes 9, 10 quickly to the left, right, up, or down, then the camera 6 sends data related to the eye movement to the processor 7, which then quickly processes this data to provide instructions to the motors 4, 5 to move the display arms 3. It is appreciated that other types of sensors or detectors may be used to measure, track or otherwise determine the position of a user's eyes, such as IR (infra-red) sensors, optical sensors, beam sensors, or laser sensors.

In one embodiment, the headset 11 also includes an accelerometer 12 or other sensor that detects and generates data related the orientation of the headset 11. The accelerometer 12 can detect motion, orientation, and/or positioning of the headset 11. Data from the accelerometer 12 is transmitted to the processor 7, and the processor 7 transmits both (1) the data related to the movement of the user's eyes 9, 10, and (2) the data related to the orientation of the headset 11 to a central processor 14 through transmitter/receiver units 8, 13. The processor 7 also receives image data related to a virtual or real world from the central processor 14. The transmitter/receiver unit 13 and the central processor 14 can be in the form of a central processing unit (CPU).

FIGS. 1A and 1B show the displays 1, 2 are moved from (1) a first position in FIG. 1A when the user's eyes 9, 10 are moved upward to (2) a second position shown in FIG. 1B when the user's eyes 9, 10 are moved downward. The camera 6 sends input related to data gathered during movement of the user's eyes 9, 10 to the processor 7, and the processor 7 then uses this data to provide input to the motors 4, 5. The motors 4, 5 then drive the display support arm 3 to different positions based on the data generated by the camera 6. The processor 7 also provides images to the displays 1, 2 based on the position of the user's eyes 9, 10. For example, if the user is looking downward, the processor 7 sends images to the displays 1, 2 for a downward view. While FIGS. 1a and 1b show a user moving their eyes up and down, one of ordinary skill in the art will recognize from the present disclosure that other movement of the eyes are captured by the system 100, including a full range of motion, to provide responsive and appropriate images to the displays 1, 2.

Figure 5A:
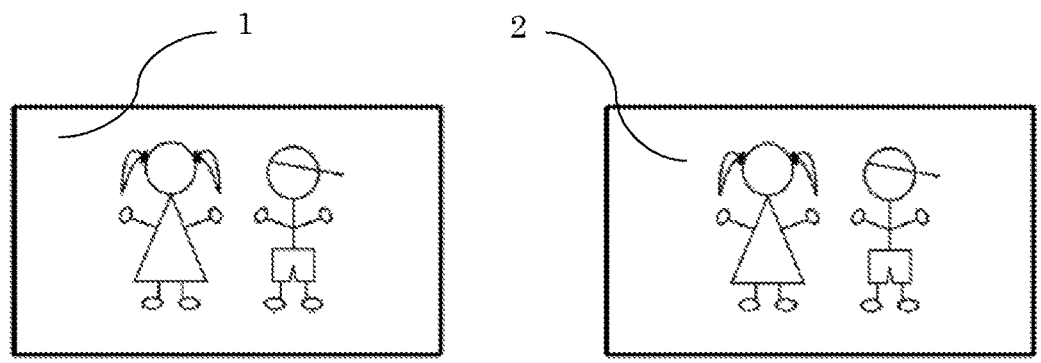
FIGS. 5A and 5B illustrate displays showing an image in two different orientations based on a user's eyes.
Figure 5B:
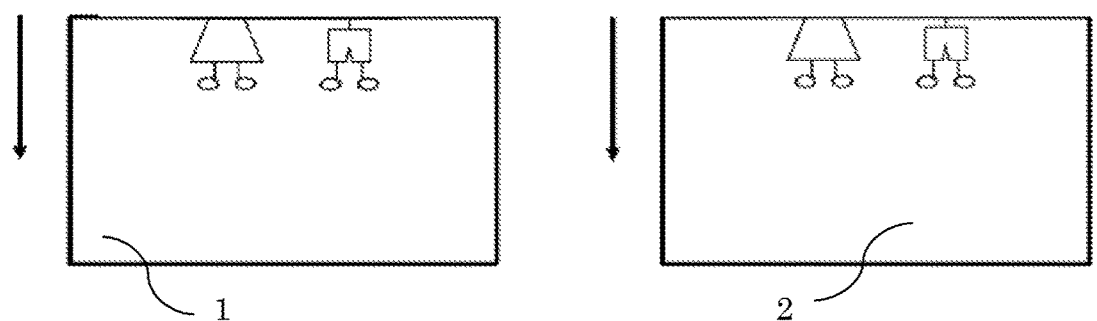

FIG. 5A illustrates the displays 1, 2 showing an image in a first orientation, and FIG. 5B illustrates the displays 1, 2 showing the image in a second orientation. As shown in FIG. 5A, the displays 1, 2 show an image of two characters in a first orientation in which the entire figures are visible. FIG. 5A corresponds to a first condition in which a user is looking straight forward. FIG. 5B corresponds to a second condition in which a user moves their eyes downward compared to the position depicted in FIG. 5A. In FIG. 5B, only the lower halves of the figures are visible. FIGS. 5A and 5B illustrate the concept that as the user moves their eyes, the image is adjusted to correspond to the position of the user's eyes.

Figure 3:
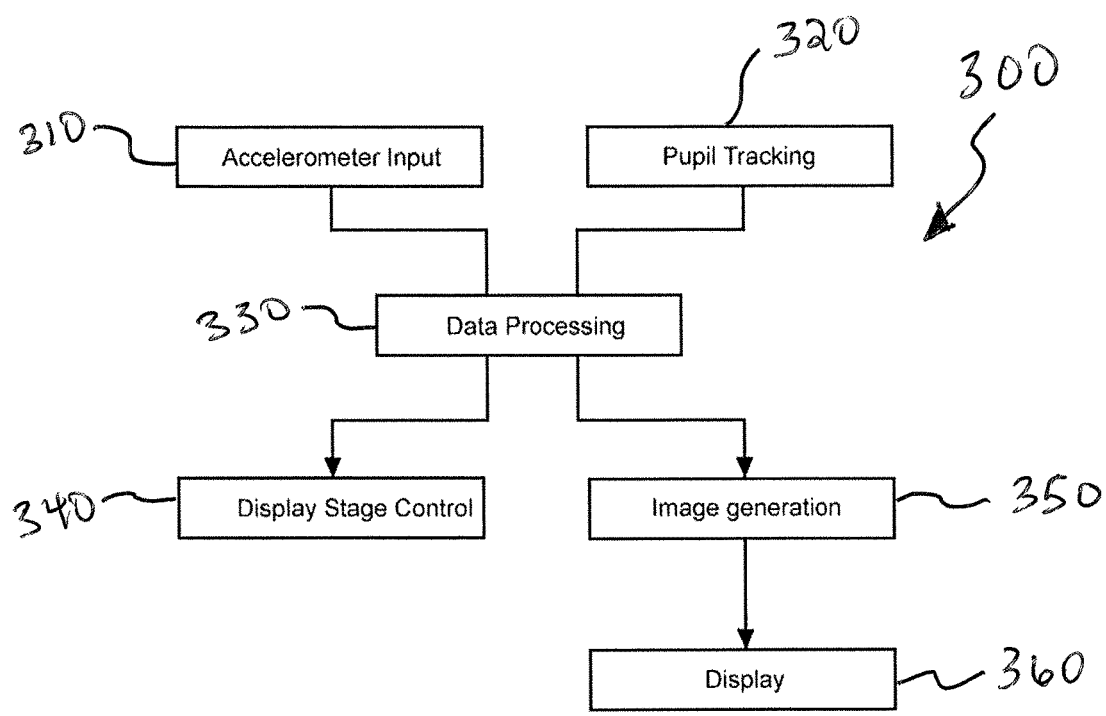
FIG. 3 is a flow diagram illustrating a process for positioning displays based on tracking of the user's eyes.

A flow diagram of a method 300 for controlling the system 100 is provided in FIG. 3. As shown in FIG. 3, input from the accelerometer 310 and input from the camera 320 are used in data processing 330 to control the display support arms 340. The display support arm moves the displays in front of a user's eyes based on movement and orientation of the user's eyes. Input from the accelerometer 310 and input from the camera 320 are also used by the controller in data processing 330 to generate image data 350 for the displays related to the orientation of headset and related to the orientation of the user's eyes, and the displays show images 360 based on the data. The flow diagram of the method 300 generally discloses two input steps, both the accelerometer input 310 and pupil/eye tracking step 320. Next, the data from both of these steps 310, 320 are processed in data processing step 330. Based on this processing step 330, then the display arms and displays are moved according to the data input in step 340. At the same time, the image generation step 350 determines the appropriate type of view that will be provided to the displays. Finally, the displays are instructed to provide a particular display in step 360 based on the previous steps 310, 320, and 330.

Figure 4:
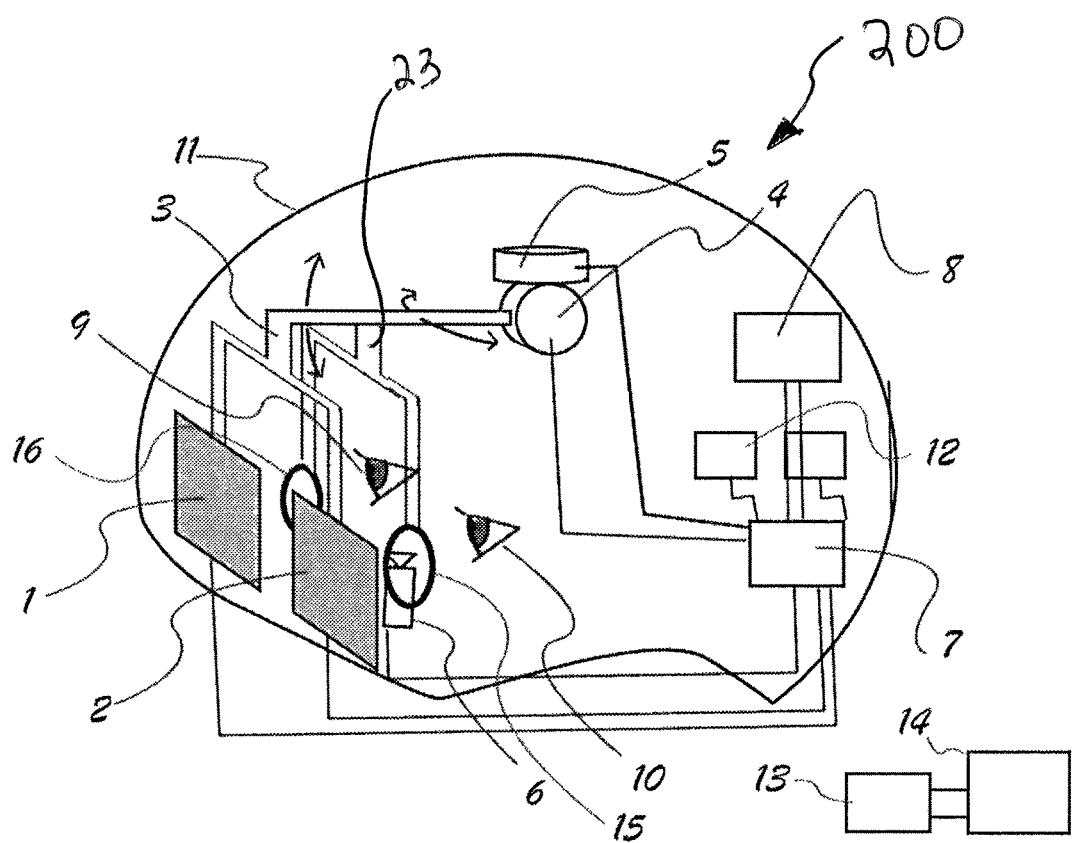
FIG. 4 illustrates an alternate embodiment of the headset including lenses.

FIG. 4 shows an alternative embodiment of the system 200 including lenses 15, 16 positioned between the user's eyes 9, 10 and the displays 1, 2. All of the components with the same reference numerals in FIG. 4 are the same as previously discussed with respect to FIGS. 1A, 1B, and 2. In FIG. 4, the lenses 15, 16 are preferably convex and are preferably arranged on a secondary support 23 connected to the display support arm 3. The secondary support 23 is arranged between the user's eyes 9, 10 and the displays 1, 2. The convex lenses 15, 16 focus light from the displays 1, 2 to make viewing the displays 1, 2 at smaller distances possible. The head mounted display device of the system 200 places the displays 1, 2 at a distance from the user's eyes 9, 10 that is less than a minimum that a human eye can focus. Therefore, the system 200 essentially provides very strong reading/magnifying glasses in the form of the convex lenses 15, 16 with, for example, refractive power of 20 diopters or more. The convex lenses 15, 16 adjust the images provided by the displays 1, 2. The convex lenses 15, 16 are physically connected to the displays 1, 2 so that they move with displays, 1, 2 such that the images of the displays 1, 2 can be orientated and positioned for the user's eyes 9, 10.

Based on the configuration of the system 100, the displays 1, 2 effectively provide an increased field of view while the resolution of the image displayed to the user is not reduced. The system 100 also allows a more natural and comfortable viewing of the virtual world because the user uses natural movement of the user's eyes as the user's eyes are used to manipulate the virtual world view instead of requiring the user to move their entire head and neck to change the view of the virtual world.

Other embodiments can include multiples cameras to track a user's eyes, and may include a myoelectric detector 17, such as shown in FIG. 2. In another embodiment, the displays 1, 2 can be stationary, and light refracting lenses are moved, instead of the displays 1, 2, as the user moves their eyes 9, 10. In another embodiment, the two displays 1, 2 are combined in one display that is moved according to the movements of the user's eyes 9, 10.

Figure 6:
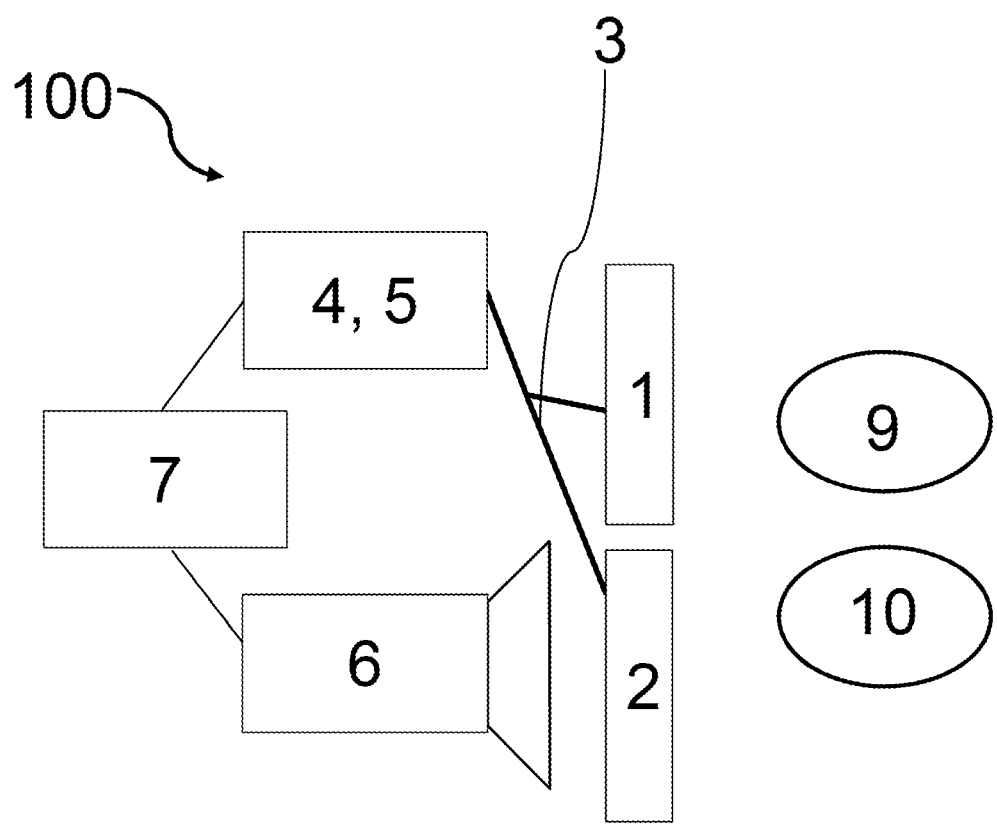
FIG. 6 is a schematic drawing of the headset of FIGS. 1A, 1B, and 2.

FIG. 6 illustrates a schematic view of the system 100 of FIGS. 1A, 1B, and 2. FIG. 6 provides a simplified representation of the displays 1, 2, the display support arm 3, the motors 4 and 5 arranged in a single housing, the processor 7, and the camera 6 facing towards the user's eyes 9, 10.

Figure 7:
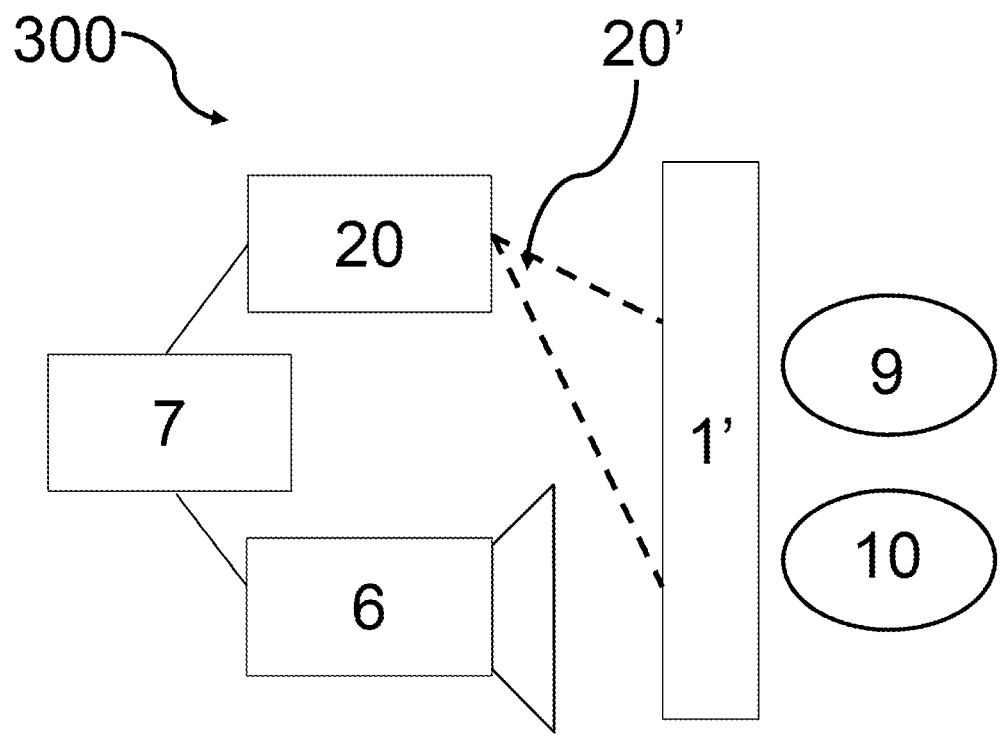
FIG. 7 is a schematic drawing of a headset according to another embodiment.

In another embodiment shown in FIG. 7, one or more projectors 20 are provided that transmit images to a display surface, generically identified as element 1'. The display surface 1' can include a surface on an interior of a helmet-like headset 11, screen, glass, or other surface. The projector 20 transmits one or more beams 20' of images to the display surface 1' The beam 20' can include a set of images, i.e. one image for a left eye and one image for a right eye, that together provide a stereoscopic image for the user's eyes 9, 10. The projector 20 is motorized and can change a position of the beam 20' based on movement of the user's head and/or position of the user's eyes 9, 10. Tracking eye movement, processing the images, and positioning the images displays based on a user's eye positioning can be accomplished in a manner similar to what has been described.

It will be appreciated that the foregoing is presented by way of illustration only and not by way of any limitation. It is contemplated that various alternatives and modifications may be made to the described embodiments without departing from the spirit and scope of the invention. Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A headset for providing images to a user comprising:
a headset configured to attach to a user's head;
displays positioned adjacent to a user's eyes;
a display support arm connected to the displays;
a motor connected to the display support arm that drives the display support arm between multiple positions;
a camera positioned adjacent to the user's eyes that records the user's eyes; and
a processor that receives data from the camera regarding a position and movement of the user's eyes, and the processor uses the data from the camera to drive the motor and to position the display support arm with respect to the user's eyes such that the displays maintain a position adjacent to the user's eyes.

2. The headset of claim 1, wherein the displays include two displays.

3. The headset of claim 1, wherein the motor includes a pitch motor and a yaw motor.

4. The headset of claim 1, wherein the camera tracks a user's eye movement.

5. The headset of claim 1, further comprising an accelerometer that measures movement of the user's head.

6. The headset of claim 1, further comprising convex lenses positioned between the displays and the user's eyes, wherein the convex lenses are attached to the display support arm.

7. The headset of claim 1, further comprising a transmission/receiving unit that sends data from the processor to a central processor.

8. The headset of claim 1, wherein the displays project stereoscopic images to the user.

9. The headset of claim 1, wherein the processor generates images related to the position and the movement of the user's eyes.

10. A headset for providing images to a user comprising:
a headset configured to attach to a user's head;
two displays, each one of the two displays positioned in front a respective one of a user's eyes, such that the two displays provide stereoscopic images to the user's eyes;
a display support arm connected to the two displays;
a pitch motor and a yaw motor, at least one of the pitch motor or the yaw motor connected to the display support arm to drive the display support arm between multiple positions;
a camera positioned adjacent to the user's eyes that records the user's eyes;
an accelerometer that measures movement of a user's head; and
a processor that receives data from the camera regarding a position and movement of the user's eyes and data from the accelerometer regarding movement of the user's head, and the processor uses the data from the camera and the accelerometer to drive the pitch motor and the yaw motor and to position the display support arm with respect to the user's eyes such that the two displays maintain a position adjacent to the user's eyes, and images provided to the displays are modified based on the data from the camera and the accelerometer.

* * * * *